(12) United States Patent
Huang et al.

(10) Patent No.: US 12,048,403 B2
(45) Date of Patent: Jul. 30, 2024

(54) INTELLIGENT ROBOT

(71) Applicant: SHENZHEN FLY RODENT DYNAMICS INTELLIGENT TECHNOLOGY CO., LTD., Shenzhen (CN)

(72) Inventors: Shusheng Huang, Shenzhen (CN); Changtai Xia, Shenzhen (CN); Ruijun Yan, Shenzhen (CN)

(73) Assignee: SHENZHEN FLY RODENT DYNAMICS INTELLIGENT TECHNOLOGY CO., LTD., Shenzhen (CN)

( * ) Notice: Subject to any disclaimer, the term of this patent is extended or adjusted under 35 U.S.C. 154(b) by 776 days.

(21) Appl. No.: 17/161,913

(22) Filed: Jan. 29, 2021

(65) Prior Publication Data
US 2022/0080593 A1   Mar. 17, 2022

(30) Foreign Application Priority Data
Sep. 11, 2020   (CN) .......................... 202010955345.8

(51) Int. Cl.
*A47L 11/40* (2006.01)
*A47L 9/00* (2006.01)

(52) U.S. Cl.
CPC ........... *A47L 11/4061* (2013.01); *A47L 9/009* (2013.01); *A47L 2201/04* (2013.01)

(58) Field of Classification Search
CPC .... A47L 11/4061; A47L 9/009; A47L 9/2805; A47L 2201/04

(Continued)

(56) References Cited

U.S. PATENT DOCUMENTS

| | | | | |
|---|---|---|---|---|
| 2013/0331990 A1* | 12/2013 | Jeong | ................... | G01S 17/931 348/118 |
| 2018/0078106 A1* | 3/2018 | Scholten | ................. | A47L 9/009 |
| 2021/0137342 A1* | 5/2021 | Furuta | ................. | A47L 11/4011 |

FOREIGN PATENT DOCUMENTS

| | | |
|---|---|---|
| CN | 104027041 A | 9/2014 |
| CN | 208851394 U | 5/2019 |

(Continued)

OTHER PUBLICATIONS

International Search Report of PCT Patent Application No. PCT/CN2020/142474 issued on Jun. 11, 2021.

*Primary Examiner* — Tom Rodgers
(74) *Attorney, Agent, or Firm* — Samson G. Yu

(57) ABSTRACT

An intelligent robot includes a main body, an environment sensing device, and a control circuit board. The main body includes a body, a protective side plate, and a partition structure. The protective side plate is movably connected to the body. The body and the protective side plate cooperatively defines an accommodation cavity, the protective side plate includes an light transmission region, the partition structure is fixedly connected to the body and received in the accommodation cavity, the partition structure divides the accommodation cavity into a first space and a second space. The environment sensing device is at least partially received in the first space, and capable of transmitting and receiving environmental sensing signals within a preset scanning angle through the light transmission region of the protective side plate. The control circuit board is received in the second space, and electrically connected to the environment sensing device.

17 Claims, 16 Drawing Sheets

(58) Field of Classification Search
USPC .......................................................... 15/319
See application file for complete search history.

(56) References Cited

FOREIGN PATENT DOCUMENTS

| | | | |
|---|---|---|---|
| CN | 110123207 | A | 8/2019 |
| CN | 110754991 | A | 2/2020 |
| CN | 111466835 | A | 7/2020 |
| IN | 207120237 | U | 3/2018 |
| IN | 110856936 | A | 3/2020 |
| KR | 20150124014 | A | 11/2015 |

\* cited by examiner

INTELLIGENT ROBOT

CROSS-REFERENCE TO RELATED APPLICATIONS

The present disclosure claims priority of Chinese Patent Application No. 202010955345.8, filed on Sep. 11, 2020, titled "INTELLIGENT ROBOT", the contents of which are incorporated herein by reference.

TECHNICAL FIELD

The present disclosure relates to the field of robots, and particularly to an intelligent robot.

BACKGROUND

At present, the intelligent robots are generally equipped with an environment sensing device to scan the surrounding environment, thus achieving the functions of ranging, obstacle avoidance, mapping and so on. A typical environment sensing device is protruding from an upper cover of the intelligent robot, such that the environment sensing device can send signals directly to the outside world and receive signals from the outside world, so as to facilitate the detection of the surrounding environment.

SUMMARY

An embodiment of the present disclosure provides an intelligent robot, the intelligent robot includes a main body, an environment sensing device, and a control circuit board. The main body includes a body, a protective side plate, and a partition structure. The protective side plate is movably connected to the body. The body and the protective side plate cooperatively defines an accommodation cavity, the protective side plate includes an light transmission region, the partition structure is fixedly connected to the body and received in the accommodation cavity, the partition structure divides the accommodation cavity into a first space and a second space, the first space is located on a side of the partition structure close to the light transmission region, and the second space is located on another side of the partition structure away from the light transmission region. The environment sensing device is at least partially received in the first space, and the environment sensing device is capable of transmitting and receiving environmental sensing signals within a preset scanning angle through the light transmission region of the protective side plate. The control circuit board is received in the second space, and the control circuit board is electrically connected to the environment sensing device.

BRIEF DESCRIPTION OF THE DRAWINGS

To describe the embodiments of the present disclosure or the technical solutions in the related art more clearly, the following will give a brief introduction to the drawings associated with the embodiments of the present disclosure or the related art. It is obvious that the drawings in the following description are only intended to illustrate the present disclosure. For those skilled in the art, some deformations can be obtained according to these drawings without any creative work.

DETAILED DESCRIPTION

The technical solutions in the embodiments of the present disclosure will be described clearly below with reference to the drawings in the embodiments of the present disclosure. Obviously, the described embodiments are only a part of the embodiments of the present disclosure, and not exhaustive. Based on the embodiments of the present disclosure, all other embodiments obtained by one of ordinary skill in the art without making creative labor fall within the scope of protection of the invention.

Figure 1:
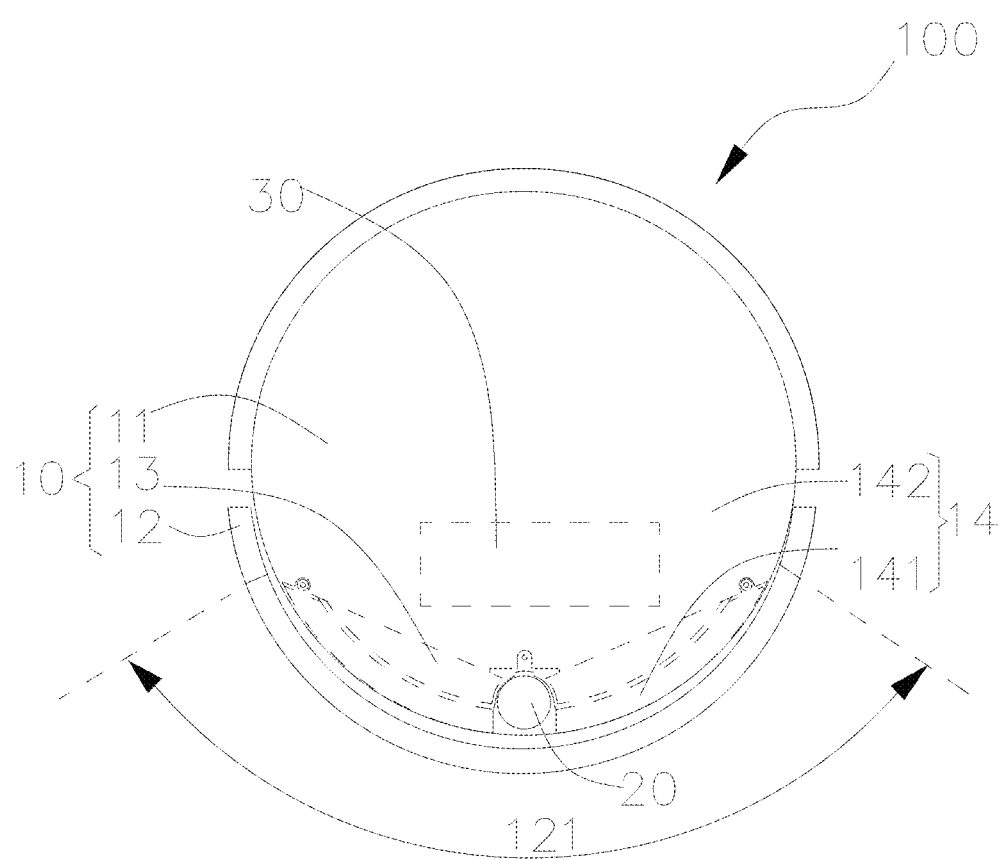
FIG. 1 is a top view of an intelligent robot according to an embodiment of the present disclosure.
Figure 2:
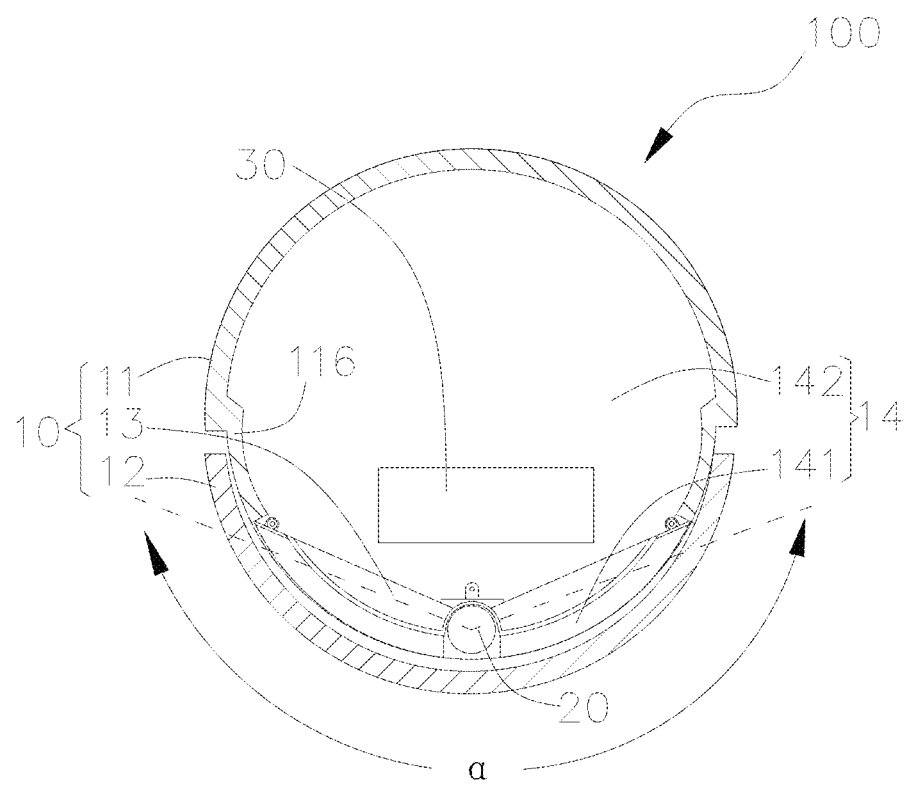
FIG. 2 is a first cross-sectional view of the intelligent robot of FIG. 1.
Figure 6:
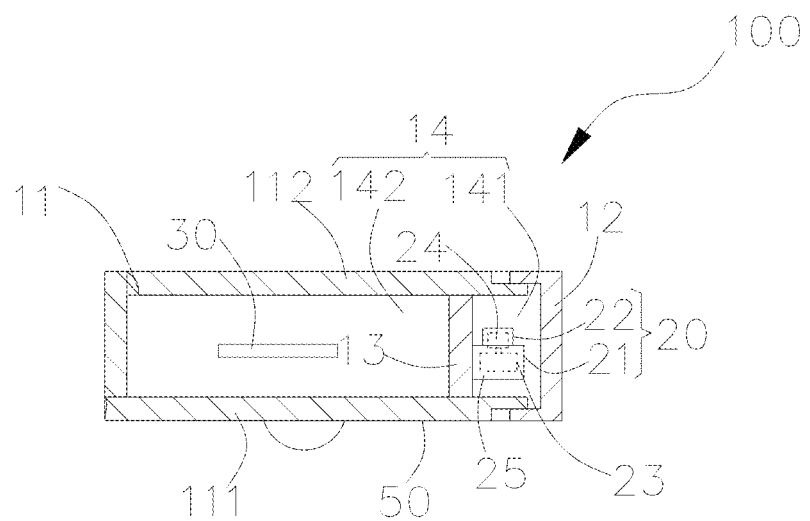
FIG. 6 is a second cross-sectional view of the intelligent robot of FIG. 1.

Referring to FIGS. 1, 2, and 6, an embodiment of the present disclosure provides an intelligent robot 100, and the intelligent robot 100 includes a main body 10, an environment sensing device 20, and a control circuit board 30.

The main body 10 includes a body 11, a protective side plate 12, and a partition structure 13. The protective side plate 12 is movably connected to the body 11. The body 11 and the protective side plate 12 cooperatively define an accommodation cavity 14. The protective side plate 12 includes a light transmission region 121. The partition structure 13 is fixedly connected to the body 11 and received in the accommodation cavity 14. The partition structure 13 divides the accommodation cavity 14 into a first space 141 and a second space 142. The first space 141 is positioned on one side of the partition structure 13 adjacent to the light transmission region 121, and the second space 142 is positioned on the other side of the partition structure 13 away from the light transmission region 121.

The environment sensing device 20 is at least partially mounted in the first space 141, and the environment sensing device 20 is capable of transmitting and receiving environmental sensing signals within a preset scanning angle α through the light transmission region 121 of the protective side plate 12.

The control circuit board 30 is mounted in the second space 142, and the control circuit board 30 is electrically connected to the environment sensing device 20.

It is understandable that the intelligent robot 100 can be, but not limited to, a sweeping robot, a mopping robot, a window cleaning robot, a vacuum cleaning robot, and so on. The embodiment of the present disclosure takes a sweeping robot as an example to illustrate the intelligent robot 100. Optionally, the above-mentioned other robots can also be applied to the technical scheme of the present disclosure.

Compared with the related art, the technical solution of the embodiments of the present disclosure has at least the following advantages:

In this embodiment, the body 11 and the protective side plate 12 cooperatively define the accommodation cavity 14. The protective side plate 12 includes the light transmission region 121. The environment sensing device 20 is received in the accommodation cavity 14, and can send and receive the environmental sensing signals within the preset scanning angle α through the light transmission region 121 of the protective side plate 12, thus avoiding the environment sensing device 20 from being exposed out of the surface of the robot to be easily impacted. In addition, the partition structure 13 divides the accommodation cavity 14 into the first space 141 and the second space 142. The first space 141 is located on the side of the partition structure 13 adjacent to the light transmission region 121, and the second space 142 is located on the other side of the partition structure 13 away from the light transmission region 121. The environment sensing device 20 is at least partially mounted in the first space 141, and the control circuit board 30 is mounted in the second space 142. As a shielding barrier, the partition structure 13 can prevent the signal of the environment sensing device 20 from entering the second space 142, thus preventing the signal from being repeatedly reflected inside the intelligent robot 100 to form an interference signal to interfere with the environment sensing device 20. The partition structure 13 can also prevent dust from entering the second space 142 and polluting the control circuit board 30, so as to systematically guarantee the stable operation of the environment sensing device 20, improving the service life and working reliability thereof.

Referring also to FIGS. 2, 3, 4 and 5, in this embodiment, the body 11 is in the shape of a circle, D-shape, rectangle, triangle or the like, and those skilled in the art can design the shape of the body 11 as needed. The body 11 includes a chassis 111 and a top cover 112, and the top cover 112 is detachably mounted on the chassis 111, so as to protect various functional components inside the intelligent robot 100 from fierce impact or accidental damage caused by dripping liquid during use. The chassis 111 and/or the top cover 112 are used to carry and support the various functional components. In an alternative embodiment, the body 11 of the intelligent robot 100 can also be other structures, for example, the body 11 is an integrated structure or a left and right separated structure. The embodiment of the present disclosure has no limitation to the material, shape, structure, etc. of the body 11.

In the embodiment, the main body 10 includes a moving mechanism 15 and a cleaning assembly 16. The moving mechanism 15 is connected to the body 11 and is configured to drive the intelligent robot 100 to move on the ground. For example, the intelligent robot 100 can be designed to independently plan the path to move on the ground, or can be designed to move on the ground in response to remote control commands. In the embodiment of the present disclosure, the moving mechanism 15 includes two driving wheels and at least one universal wheel, and the two driving wheels and the universal wheel at least partially protrude from the bottom of the chassis 111. In an alternative embodiment, the moving mechanism 15 can also include any one of triangular crawler wheels or Mecanum wheels.

The cleaning assembly 16 is detachably connected to the body 11. The cleaning assembly 16 includes an intermediate sweeping assembly, a mopping assembly, or a combination thereof. The intermediate sweeping assembly includes at least one intermediate sweeping brush, and the at least one intermediate sweeping brush may include an intermediate sweeping hairbrush, an intermediate sweeping rubber brush, or a combination thereof. The at least one intermediate sweeping brush is positioned in a groove defined in the bottom of the chassis 111, and a dust suction port is arranged in the groove. The dust suction port communicates with a dust collecting box and a dust suction fan, such that when the intermediate sweeping brush rotates, the dust and debris are stirred up and sucked into the dust collection box via the dust suction port by the dust suction fan. The mopping assembly includes a bracket detachably connected to the chassis 111 and a mopping component attached to the bracket. The mopping component is configured to be in contact with a surface to be cleaned, and mops and cleans the passing surface when the robot body 10 moves.

The top cover 112 includes a button. The top cover 112 covers the chassis 111. The top cover 112 is fixedly connected to the chassis 111 by screw connection and the like. The protective side plate 12 connects the edge of the chassis 111 and the edge of the top cover 112. The protective side plate 12 is capable of moving with respect to the chassis 111 and the top cover 112, thereby being extendable or contractive with respect to the body 11. The protective side plate 12 can be in any shape, such as arc, ring, U-shape, etc., which can be arbitrarily determined according to the actual needs and is not limited herein. The intelligent robot 100 further includes at least one collision detection sensor 40 electrically connected to the control circuit board 30. The at least one collision detection sensor 40 is configured to detect whether the protective side plate 12 is contractive relative to the body 11. When the at least one collision detection sensor 40 detects that the protective side plate 12 is contractive relative to the body 11, a collision signal is produced. The collision signal represents that the protective side plate 12 of the intelligent robot 100 collides with an obstacle, thereby achieving the perception of the intelligent robot 100 to the obstacles.

The protective side plate 12, the chassis 111, and the top cover 112 cooperatively define the accommodation cavity 14. The accommodation cavity 14 provides space for layout of the internal components of the intelligent robot 100. A fan, a main circuit board, the collision detection sensor, a wall sensor and the like of the intelligent robot 100 are arranged in the accommodation cavity 14.

The chassis 111 includes a front end 113 adjacent to the light transmission region 121 and a rear end opposite to the front end 113. The environment sensing device 20 is fixedly positioned on the front end 113 and adjacent to the light transmission region 121, such that the environment sensing device 20 can transmit the environmental sensing signal to the front of the intelligent robot 100. In the embodiment, the environment sensing device 20 is a laser radar, and then the environmental sensing signal is a laser signal. The environment sensing device 20 can transmit a laser signal through the light transmission region 121, the laser signal will be reflected to form a laser reflection signal after encountering an obstacle. The environment sensing device 20 can receive the laser reflection signal through the light transmission region 121. Thus, the environment sensing device 20 perceives obstacle information through the laser signal, so as to map and locate the scene where the robot is located. The environment sensing device 20 can be a single line laser radar or a multi-line laser radar according to actual needs. In other embodiments, the environment sensing device 20 can be an ultrasonic sensor, 3D-TOF sensor, camera or the like.

The light transmission region 121 extends along the circumference of the protective side plate 12, and the light transmission region 121 has a certain width in the horizontal direction, such that the environment sensing device 20 can send and receive the environmental sensing signals within a preset scanning angle α through the light transmission region 121. The preset scanning angle α of the environment sensing device 20 is greater than or equal to 180°, such that the environment sensing device 20 has a horizontal field of view angle which is large enough, so as to sense most of the area in front of the intelligent robot 100, and reduce the blind area of environment detection. For example, the preset scanning angle α of the environment sensing device 20 can be any one of 180°, 190°, 200°, 210°, 220°, 230° and so on, and those skilled in the art can set the preset scanning angle α according to actual needs.

Figure 3:
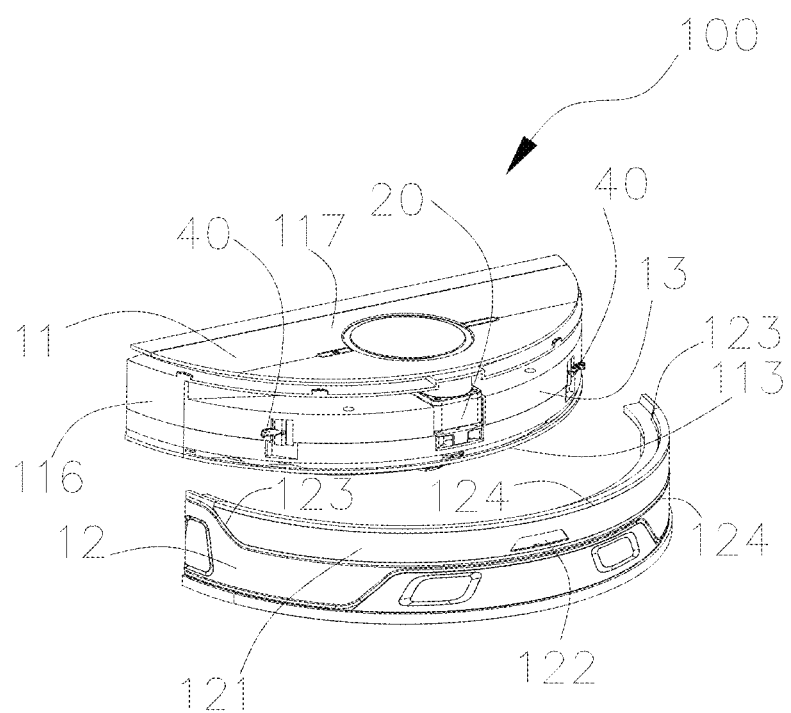
FIG. 3 is a first exploded view of part of the intelligent robot of FIG. 1.
Figure 4:
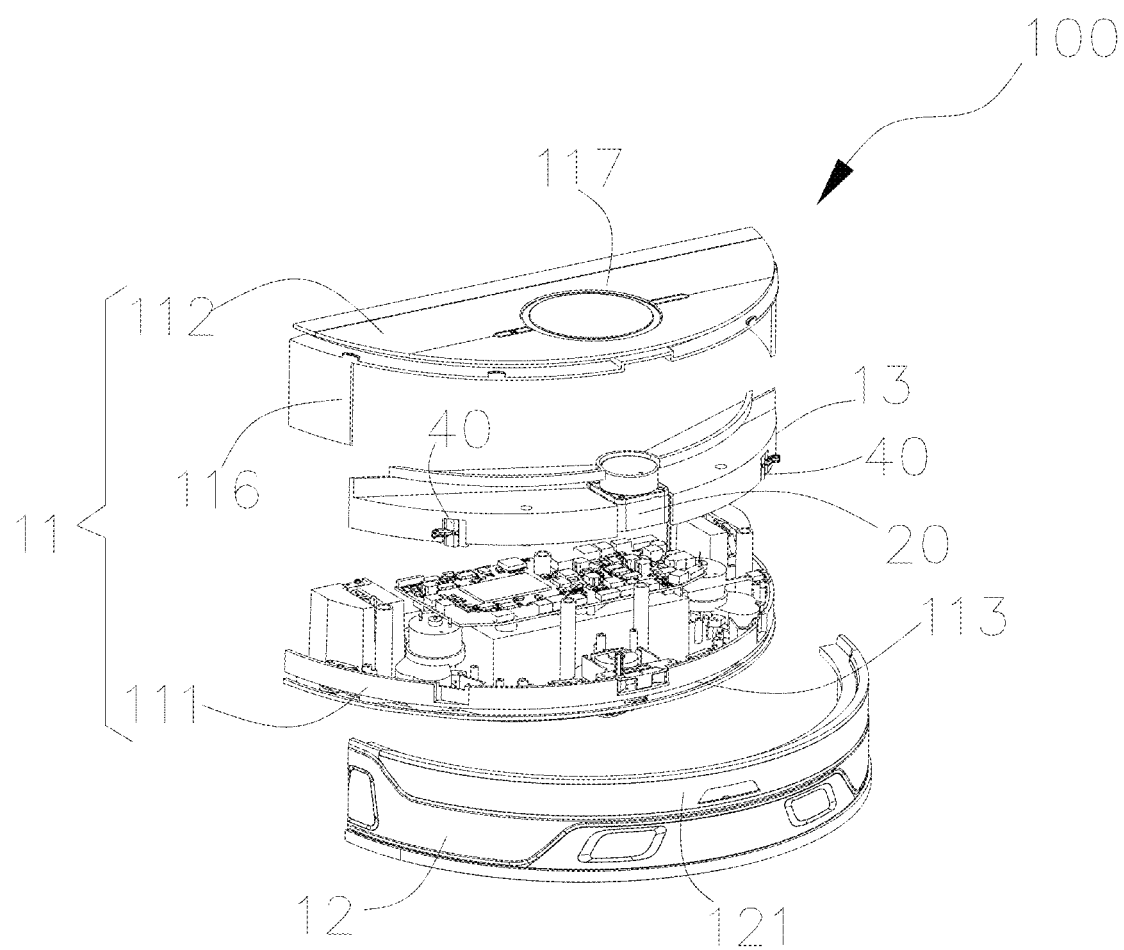
FIG. 4 is a second exploded view of part of the intelligent robot of FIG. 1.
Figure 5:
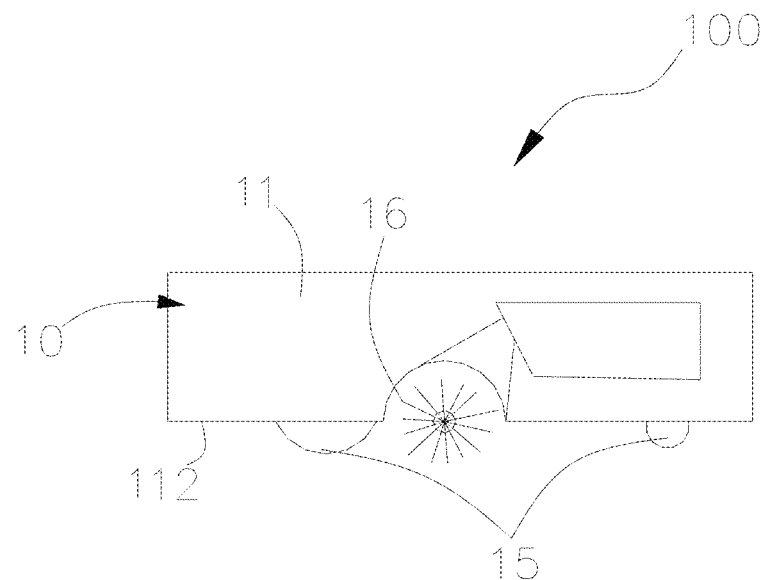
FIG. 5 is a schematic view of the intelligent robot of FIG. 1.

Referring to FIGS. 3, 4 and 6, the partition structure 13 is in a long strip shape and is arranged close to the front end 113 of the chassis 111. In one embodiment, the partition structure 13 can be integrated with the chassis 111 or the top cover 112, thus improving the structural stability of the partition structure 13, reducing the number of components, and reducing the assembly difficulty and manufacturing cost. In another embodiment, the partition structure 13, the chassis 111 and the top cover 112 are mutually independent components, and the partition structure 13 can be fixedly connected to the chassis 111 or/and the top cover 112 by screw connection, snap-fit connection, riveting or inserting, thus conveniently integrating the partition structure 13, the chassis 111 and the top cover 112 as a whole or disassembling the whole structure into independent components for maintenance or replacement.

The material and shape of the partition structure 13 are arbitrary according to the actual needs of those skilled in the art.

The partition structure 13 is lightproof, and the partition structure 13 can operate as a light shielding barrier, preventing the signal of the environment sensing device 20 from leaking into the second space 142, avoiding the repeated reflection of the signal of the environment sensing device 20 to form a strong interference signal, and reducing the interference to the environment sensing device 20. Moreover, the partition structure 13 can prevent dust from entering the second space 142.

The top cover 112 includes a side plate 116. The side plate 116 and the partition structure 13 are adjacent continuously to form a closed loop. The side plate 116 and the partition structure 13 are cooperatively arranged around an edge of the chassis 111, and the second space 142 is located in the inner side of the closed loop formed by the side plate 116 and the partition structure 13. In this way, the second space 142 provides large enough space, thus reducing the influence of the partition structure 13 on the layout of internal components in the intelligent robot 100. The side plate 116 is substantially U-shaped. The closed loop can be a circular closed loop, rectangular closed loop, D-shaped closed loop, special-shaped closed loop or the like, which is not limited in the present disclosure. In one embodiment, the outer wall of the side plate 116 is in smooth transition with the outer wall of the partition structure 13.

The top cover 112 includes a cover plate 117. The cover plate 117 covers one side of the side plates 116 and the partition structure 13 facing away from the chassis 111. The cover plate 117, the side plates 116, the partition structure 13 and the chassis 111 cooperatively define the second space 142.

The first space 141 is located between the protective side plate 12 and the partition structure 13. Because the protective side plate 12 is movable freely, such that the first space 141 can change with the movement of the protective side plate 12. For example, when the protective side plate 12 extends relative to the body 11, the first space 141 becomes larger; when the protective side plate 12 is contractive relative to the body 11, the second space 142 becomes smaller. The main body 10 further includes an elastic member positioned in the first space 141. The elastic member is elastically connected to the body 11 and the protective side plate 12. The elastic member provides the elastic force for the protective side plate 12 to move away from the partition structure 13, such that the first space 141 can automatically return to a larger state.

Referring to FIGS. 3, 4 and 6, the bottom surface of the main body 10 is defined as a reference surface 50. The environment sensing device 20 includes a base 21, a light transmitting cover 22 positioned on the base 21, a driving assembly 23 and a scanning assembly 24. The base 21 is fixed on the body 11. The orthographic projection of the base 21 on the reference surface 50 coincides with the orthographic projection of the light transmitting cover 22 on the reference surface 50. The light transmitting cover 22 and the base 21 cooperatively define a receiving chamber 25. The driving assembly 23 is fixed on the base 21. The driving assembly 23 and the scanning assembly 24 are both received in the receiving chamber 25. The driving assembly 23 is configured to drive the scanning assembly 24 to rotate and the rotating scanning assembly 24 transmits and receives the environmental sensing signals through the light transmitting cover 22.

In this embodiment, the environment sensing device 20 is a 2D TOF radar, and uses the time flight principle to measure the distance.

The light transmitting cover 22 can be fixedly connected to the base 21 by screw connection, glue bonding or thread connection. The light transmitting cover 22 can be hermetically connected to the base 21. The signal received and transmitted by the scanning assembly 24 passes through the light transmitting cover 22.

The driving assembly 23 includes a motor stator and a motor rotor. The motor stator and the motor rotor form a compact brushless motor occupying little space. The motor stator is fixedly positioned on the base 21, and the motor rotor is fixedly positioned on the scanning assembly 24. The central axis of the motor stator, the central axis of the motor rotor and the rotating axis of the scanning assembly 24 are all coincident. The motor stator can drive the motor rotor to rotate relative to the base 21 by electromagnetic force, thus driving the scanning assembly 24 to rotate relative to the base 21. In other embodiments, the driving assembly 23 can also include a motor and a transmission component. The motor is fixed on the base 21. The transmission component is connected between the scanning assembly 24 and the drive shaft of the motor. The transmission component can be a conveyor belt or a gear, such that the motor drives the scanning assembly 24 to rotate through the transmission component.

The scanning assembly 24 includes a laser transmitter and a single photon detection chip. The planes of the emission path of the laser transmitter and the receiving path of the single photon detection chip are perpendicular to the rotation axis of the scanning assembly 24, and the emission path of the laser emitter is parallel to the receiving path of the single photon detection chip. In other embodiments, the laser radar can be a triangular ranging radar. The scanning assembly 24 is driven to rotate through the driving assembly 23. The laser transmitter transmits a detection light signal, and the single photon detection chip can receive a reflected light signal reflected by an obstacle. The laser radar can realize two-dimensional ranging according to the time flight ranging principle. Conventionally, a detection chip with a large photosensitive area, a plurality of detection chips, or a focusing light transmitting component is applied to improve the ability of detecting reflected light of a laser radar, which, however, increases the system complexity and the size of laser radar. In this disclosure, a small-sized single photon detection chip is adopted, and the emission path of the laser transmitter is parallel to the receiving path of the single photon detection chip, which greatly reduces the space occupied by the scanning assembly 24, thus reducing the size of the radar. The small-sized single photon detection chip has high photoelectric gain, which can significantly improve the ability of detecting reflected light signal of a laser radar, thus ensuring the ranging effect without complex circuit devices. Therefore, the laser radar has a small volume and does not need to occupy too much internal space of the main body 10. In other embodiments, the environment sensing device 20 can be a solid-state laser radar.

Figure 7:
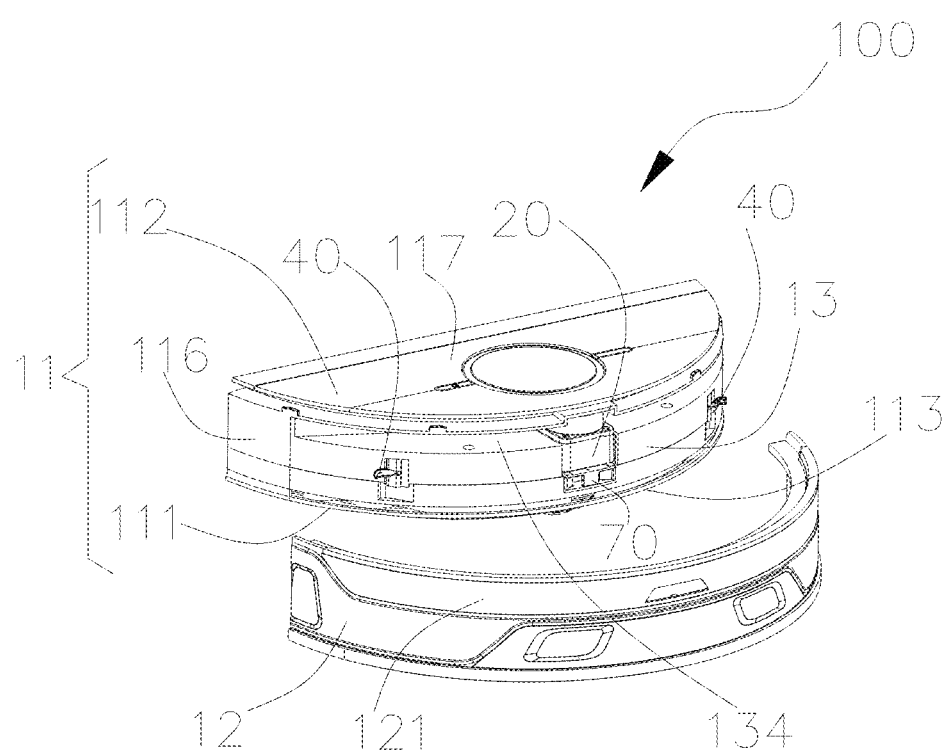
FIG. 7 is a third exploded view of part of the intelligent robot of FIG. 1.
Figure 8:
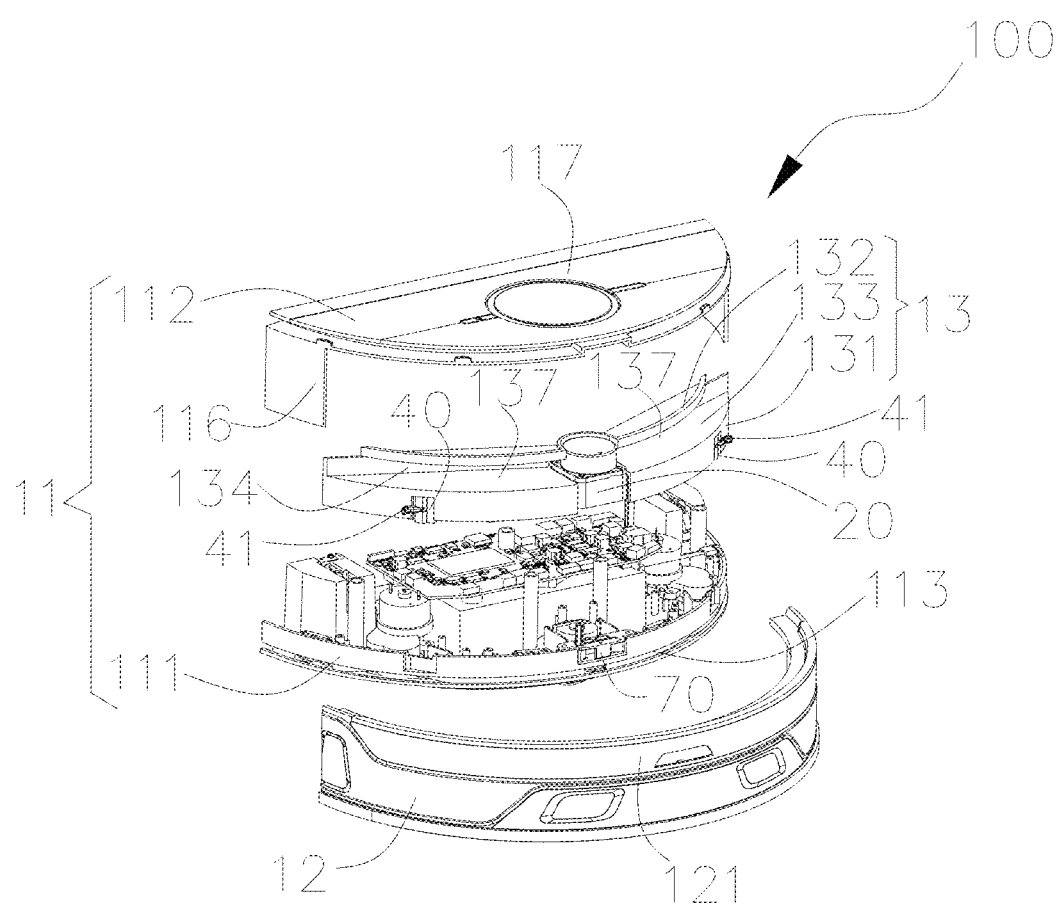
FIG. 8 is a fourth exploded view of the intelligent robot of FIG. 1.

Referring to FIGS. 7-8, further, a signal scanning space 134 is defined in one side of the partition structure 13 close to the protective side plate 12. The signal scanning space 134 forms a part of the first space 141, and the environment sensing device 20 can transmit and receive environmental sensing signals through the signal scanning space 134.

In a first exemplary embodiment, the signal scanning space 134 is located on one side of the partition structure 13 close to the top cover 112, and a space is formed between the signal scanning space 134 and the chassis 111 to accommodate other devices.

In a second exemplary embodiment, the signal scanning space 134 is located on one side of the partition structure 13 close to the chassis 111, and a space is formed between the signal scanning space 134 and the top cover 112 to accommodate other devices.

This embodiment is described based on the first exemplary embodiment. The partition structure 13 includes a first side plate 131, a second side plate 132, and a horizontal baffle plate 133. The first side plate 131, the second side plate 132 and the horizontal baffle plate 133 extend along the length direction of the partition structure 13. The first side plate 131 is connected to one side of the chassis 111 close to the top cover 112. The second side plate 132 is connected to one side of the top cover 112 close to the chassis 111. The second side plate 132 is opposite to the light transmission region 121 of the protective side plate 12. The horizontal baffle plate 133 is fixedly connected to the first side plate 131 and the second side plate 132, and is spaced apart from the top cover 112. The horizontal baffle plate 133, the second side plate 132 and the top cover 112 cooperatively define the signal scanning space 134.

Figure 9:
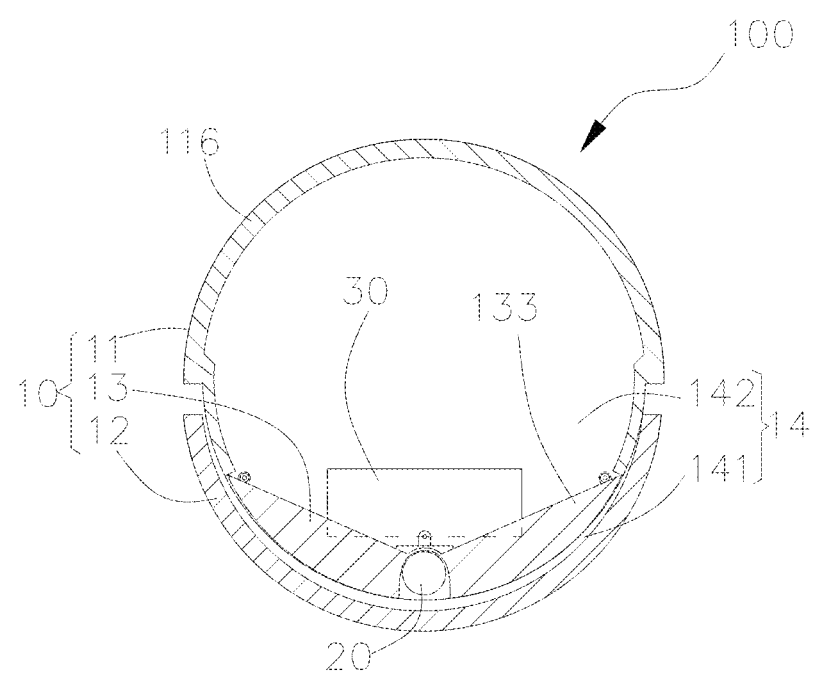
FIG. 9 is a third cross-sectional view of the intelligent robot of FIG. 1.

Referring to FIGS. 7-9, further, the first side plate 131 is fixed on the edge of the chassis 111 close to the protective side plate 12, the horizontal baffle plate 133 is also spaced apart from the chassis 111, and the space between the horizontal baffle plate 133 and the chassis 111 forms a part of the second space 142.

In the embodiment, the first side plate 131 is close to the front end 113 of the chassis 111, and the first side plate 131 is aligned with the edge of the chassis 111, so as to maximize the second space 142 and provide a larger layout space.

Referring to FIG. 9, in certain embodiments, the control circuit board 30 is partially received in the space between the horizontal baffle plate 133 and the chassis 111, and the orthographic projection of the control circuit board 30 on the chassis 111 partially coincides with the orthographic projection of the horizontal baffle 133 on the chassis 111, such that the control circuit board 30 and the partition structure 13 are compact in structure, and the control circuit board 30 is not necessarily moved backward, thus avoiding occupying the layout space of other components.

Referring also to FIGS. 7-8, in one embodiment, the main body 10 includes at least one collision detection sensor 40 mounted in the space between the horizontal baffle plate 133 and the chassis 111. The at least one collision detection sensor 40 is staggered with the signal scanning space 134 to avoid the interference of the at least one collision detection sensor 40 with the environment sensing device 20. The first side plate 131 defines at least one opening corresponding to the at least one collision detection sensor 40 one by one in position. Each collision detection sensor 40 includes a movable trigger rod 41. The trigger rod 41 of each collision detection sensor 40 passes through a corresponding opening to abut again the protective side plate 12. The trigger rod 41 of each collision detection sensor 40 is capable of swinging with the movement of the protective side plate 12. The at least one collision detection sensor 40 can sense whether the protective side plate 12 collides with an obstacle through the trigger rod 41, and further generate a collision detection signal when the protective side plate 12 collides with the obstacle.

Figure 10:
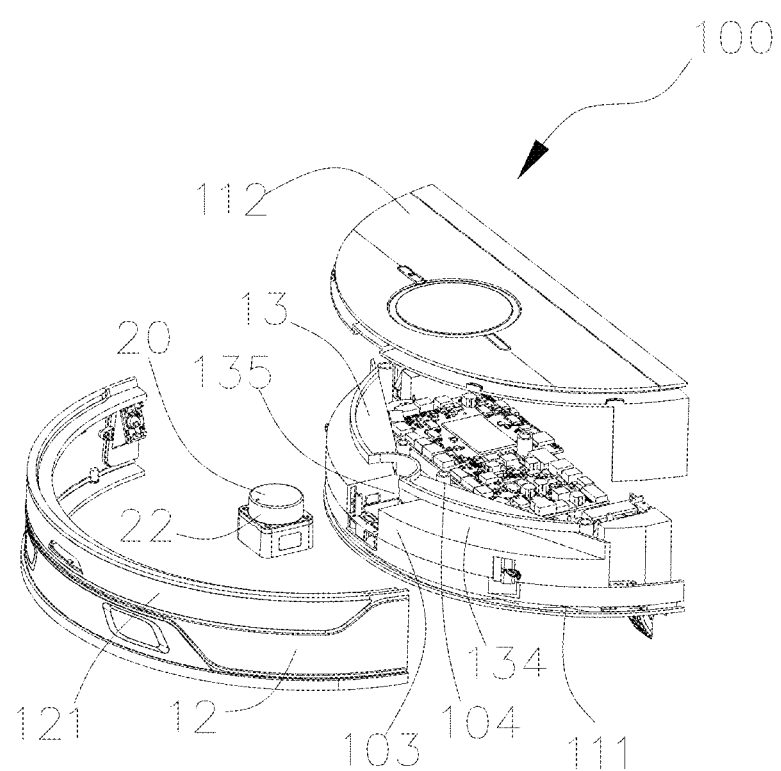
FIG. 10 is a fifth exploded view of the intelligent robot of FIG. 1.

Referring to FIGS. 1 and 10, further, the side surface of the partition structure 13 close to the protective side plate 12 is concave to form a mounting groove 135. The mounting groove 135 is a part of the first space 141 and communicates with the signal scanning space 134. The environment sensing device 20 is at least partially mounted in the mounting groove 135 and partially extends into the signal scanning space 134.

In the embodiment, the partition structure 13 includes a first sidewall 103 and a second sidewall 104. The first sidewall 103 is adjacent to the protective side plate 12. The second sidewall 104 is opposite to the first sidewall 103. The first sidewall 103 is aligned with the edge of the chassis 111. Part of the first sidewall 103 extends toward the second sidewall 104 to form the mounting groove 135. The signal scanning space 134 runs through the first sidewall 103. The signal scanning space 134 is opposite to the light transmission region 121 of the protective side plate 12. The base 21 of the environment sensing device 20 is at least partially mounted in the mounting groove 135, and the light transmitting cover 22 of the environment sensing device 20 extends into the signal scanning space 134. The mounting groove 135 provides the space for the environment sensing device 20 to be mounted in the front end 113 of the body 11, which is conducive to saving the internal space of the intelligent robot 100 to accommodate the environment sensing device 20, so as to avoid affecting arrangement of other components. The mounting groove 135 includes a mounting opening facing the protective side plate 12, and the environment sensing device 20 is detachably mounted in the mounting groove 135 through the mounting opening, such that when the environment sensing device 20 needs to be replaced or maintained, dismount the protective side plate 12, and the environment sensing device 20 can be removed from the mounting groove 135 without removing the top cover 112. In this way, the disassembly and assembly of the environment sensing device 20 is greatly simplified.

Figure 11:
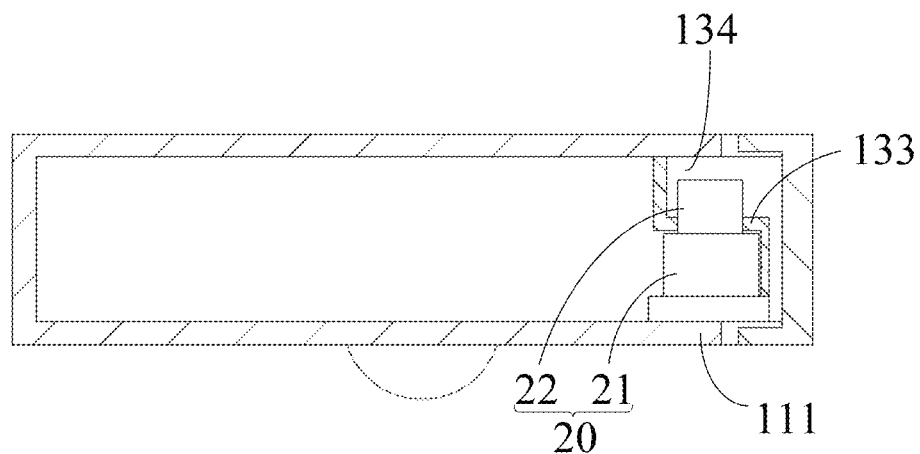
FIG. 11 is a fourth cross-sectional view of the intelligent robot of FIG. 1.

Referring to FIG. 11, in other embodiments, the environment sensing device 20 is partially received in the space between the horizontal baffle plate 133 and the chassis 111, and the environment sensing device 20 partially extends into the signal scanning space 134. The base 21 of the environment sensing device 20 is at least partially mounted in the space between the horizontal baffle plate 133 and the chassis 111, and the light transmitting cover 22 of the environment sensing device 30 extends into the signal scanning space 134.

Figure 12:
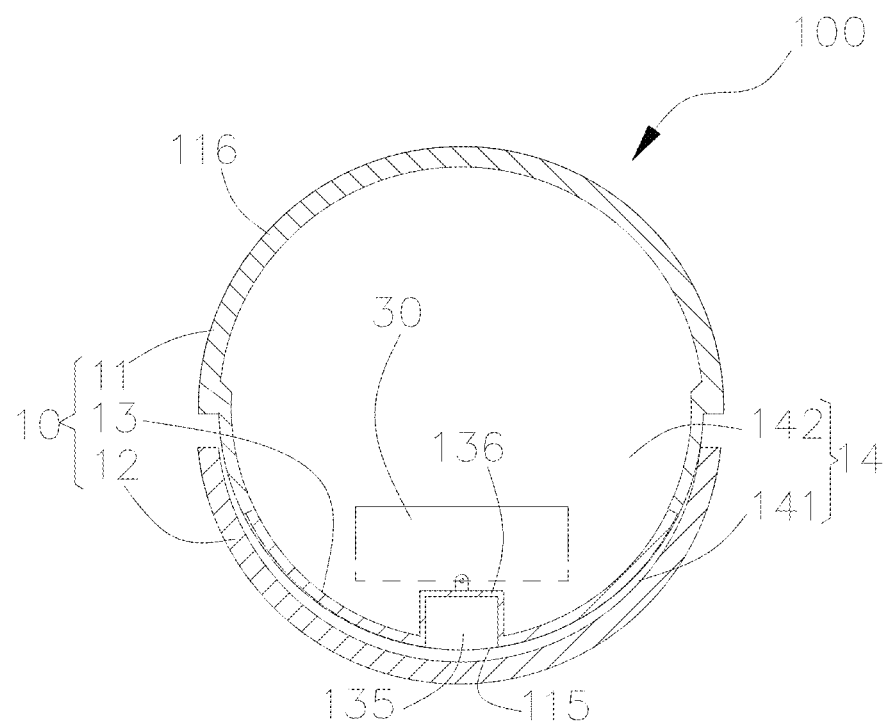
FIG. 12 is a fifth cross-sectional view of the intelligent robot of FIG. 1.

Referring to FIGS. 10 and 12, further, the body 11 includes a front edge 115 adjacent to the protective side plate 12. The partition structure 13 is aligned with the front edge 115. A protrusion 136 is positioned on one side of the partition structure 13 facing away from the front edge 115, and the mounting groove 135 is positioned at the position of the partition structure 13 corresponding to the protrusion 136.

In the embodiment, the first sidewall 103 of the partition structure 13 is aligned with the front edge 115. The second sidewall 104 protrudes in the direction away from the first sidewall 103 to form the protrusion 136, and a position of the first sidewall 103 corresponding to the protrusion 136 extends towards the second sidewall 104 to form the mounting groove 135. The formation of the protrusion 136 increases the local width of the partition structure 13, which is conducive to designing a groove of larger size to accommodate the environment sensing device 20. The size of other parts of the partition structure 13 can be controlled at a smaller value.

Referring to FIGS. 8, 10, 13 and 14, further, the side surface of the partition structure 13 close to the protective side plate 12 is concave to form two opposite optical channels 137. The two optical channels 137 both communicate with the mounting groove 135 and are in the shape of long strips. The extension directions of the two optical channels 137 form an angle and the two optical channels 137 format least a part of the signal scanning space 134.

In the embodiment, the first sidewall 103 of the partition structure 13 is concave to form the two optical channels 137. The two optical channels 137 are in a same plane. The two optical channels 137 expand more space in the partition structure 13, providing a channel for the environmental sensing signal of the environment sensing device 20, such that the environment sensing device 20 can transmit and receive the environmental sensing signal within a larger preset scanning angle α. The extension directions of the two optical channels 137 form an angle. The angle matches the preset scanning angle α of the environment sensing device 20. The angle is greater than or equal to 180°, and can be set according to the preset scanning angle α of the environment sensing device 20.

Figure 14:
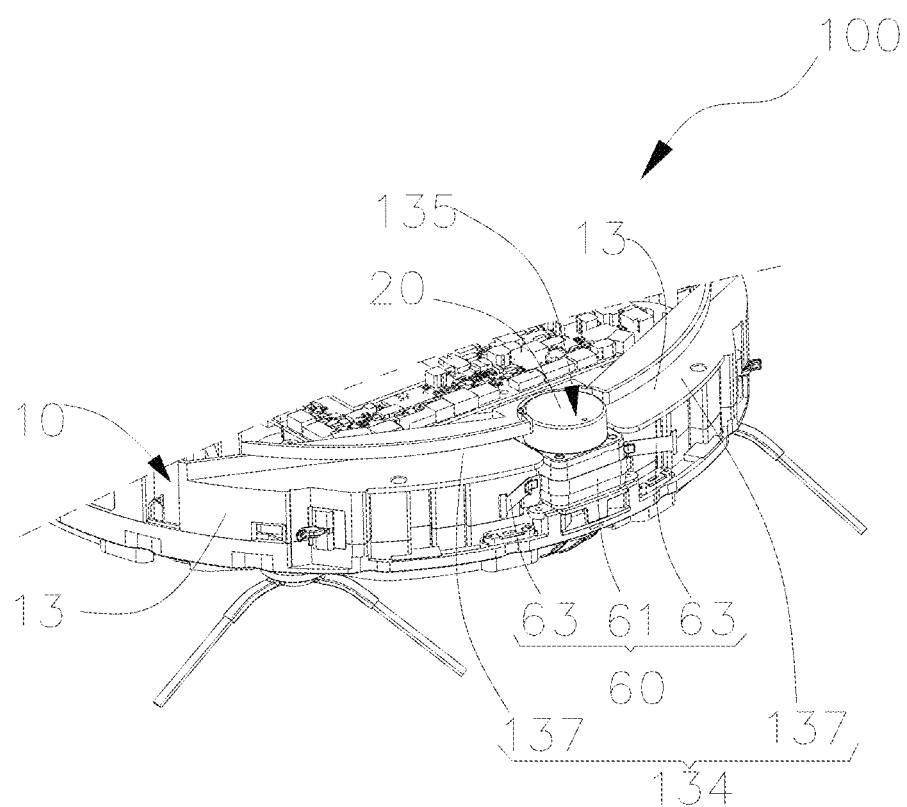
FIG. 14 is a schematic view of part of the intelligent robot of FIG. 1.

Referring to FIGS. 8 and 14, further, the environment sensing device 20 partially extends out of the mounting groove 135 in the direction close to the protective side plate 12. The main body 10 further includes a collision protecting component 60. The collision protecting component 60 includes a connection arm 61 and two elastic arms 63 respectively fixed on two opposite ends of the connection arm 61. The two ends of the connection arm 61 are fixed on the side of the partition structure 13 close to the protective side plate 12. The connection arm 61 stretches across the mounting groove 135 and is tightly attached to the part of the environment sensing device 20 extending out of the mounting groove 135. The free ends of the two elastic arms 63 extend beyond the connection arm 61 in a direction close to the protective side plate 12 and abut against the protective side plate 12.

In the embodiment, the protective side plate 12 is separated from the environment sensing device 20 via the collision protecting component 60. The collision protecting component 60 can be a metal elastic piece, and the collision protecting component 60 is elastic. The connection arm 61 stretches over the mounting groove 135 and is tightly attached in the part of the environment sensing device 20 extending out of the mounting groove 135, and thus the connection arm 61 can firmly secure the environment sensing device 20 in the mounting groove 135. In addition, the free ends of the two elastic arms 63 extend beyond the connection arm 61 in the direction close to the protective side plate 12 and abut against the protective side plate 12, and the two elastic arms 63 are arranged in an obtuse angle in a natural state, such that the two elastic arms 63 have enough field angles to balance the impact of the collision on the protective side plate 12.

Figure 13:
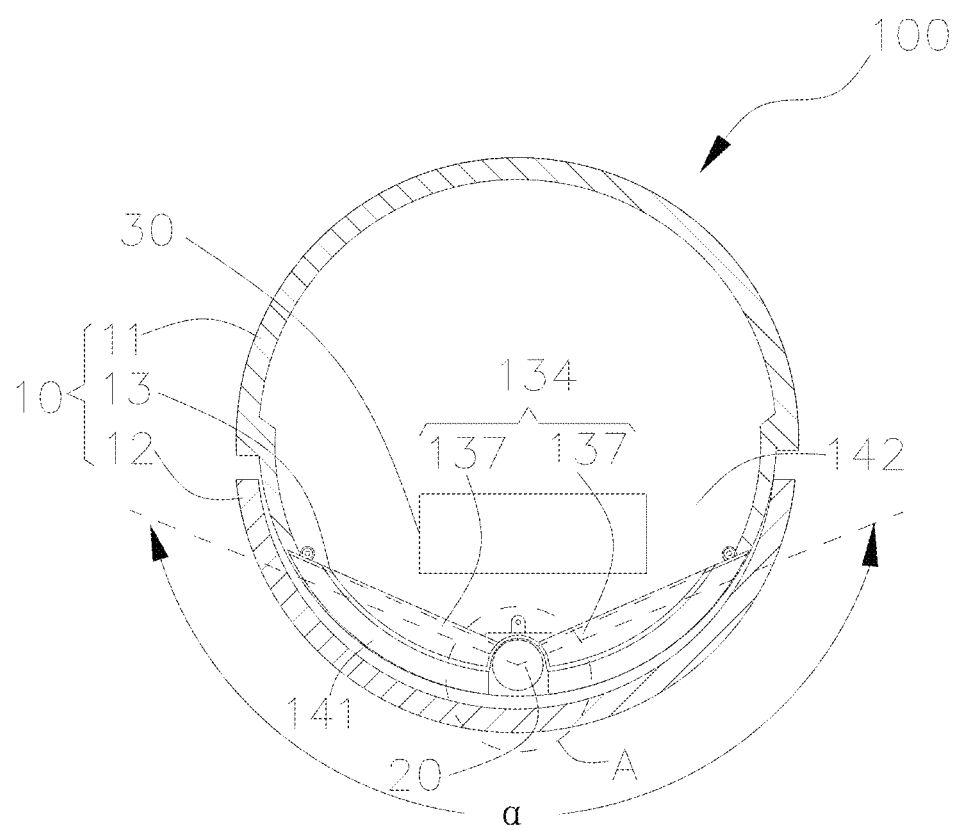
FIG. 13 is a sixth cross-sectional view of the intelligent robot of FIG. 1.
Figure 15:
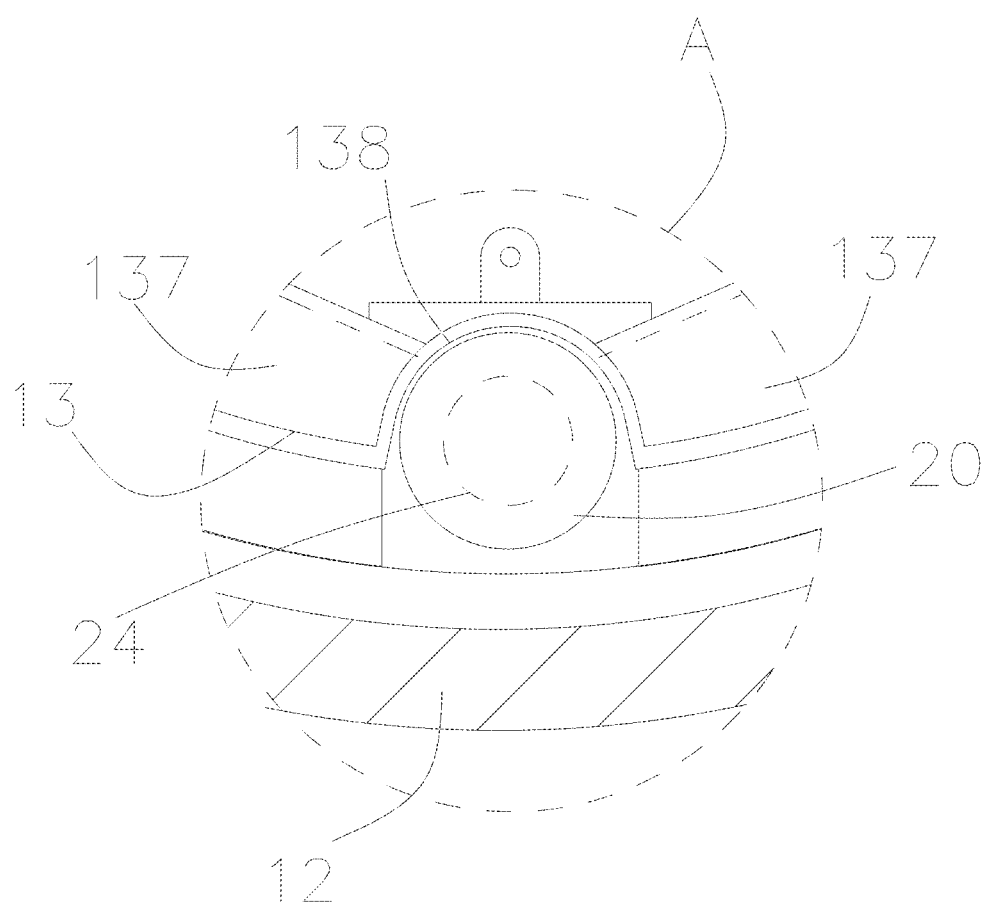
FIG. 15 is an enlarged view of part A in FIG. 13.

Referring to FIGS. 13 and 15, further, the signal scanning space 134 includes an arc-shaped inner wall 138 between the two optical channels 137. The arc-shaped inner wall 138 partially surrounds the environment sensing device 20. The center of the arc-shaped inner wall 138 coincides with the scanning center of the environment sensing device 20. In the embodiment, the arc-shaped inner wall 138 partially surrounds the light transmitting cover 22 and the scanning assembly 24. The center of the arc-shaped inner wall 138 coincides with the scanning center of the environment sensing device 20, that is, the center of the arc-shaped inner wall 138 coincides with the center line of the light transmitting cover 22 and the central line of the rotating shaft of the scanning assembly 24. The scanning assembly 24 is rotatable at 360° in the light transmitting cover 22, and transmits and receives the environmental sensing signals through the light transmitting cover 22 during the rotation. Because the center of the arc-shaped inner wall 138 coincides with the scanning center of the environment sensing device 20, the sensing signals of the environment sensing device 20 from the arc-shaped inner wall 138 are all the same, so as to distinguish the scanning signal of the environment sensing device 20 at the arc-shape inner wall 138 from the scanning signal within the preset scanning angle α.

Figure 17:
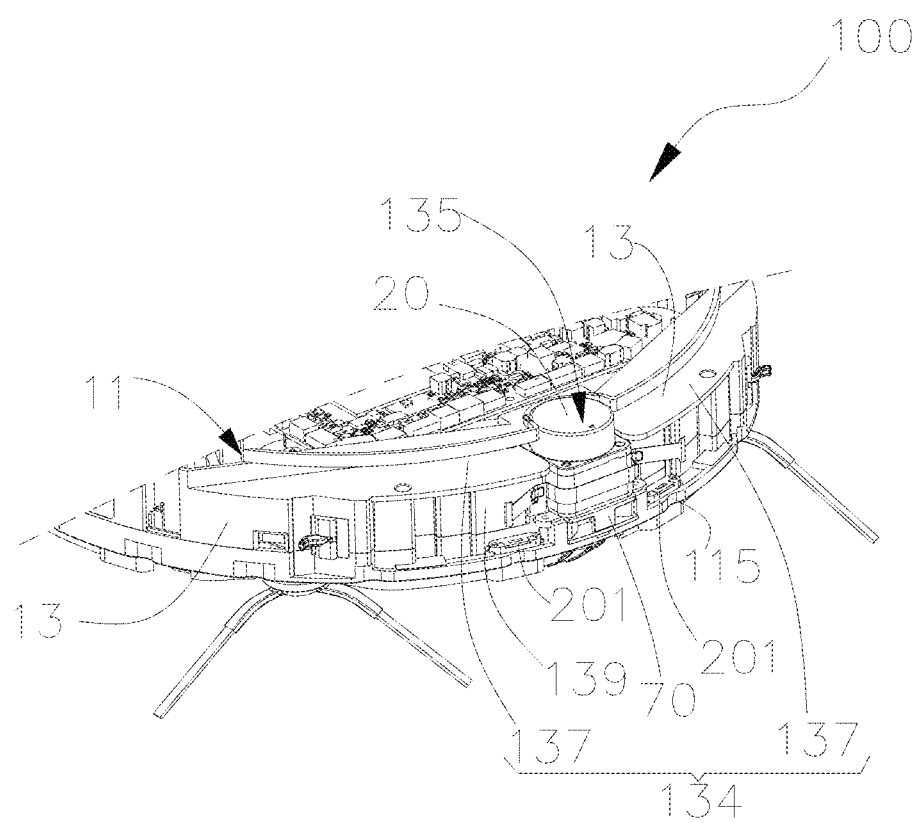
FIG. 17 is another schematic view of part of the intelligent robot of FIG. 1.

Referring to FIG. 17, further, the signal scanning space 134 is formed on the side of the partition structure 13 close to the top cover 112, and a space is positioned between the signal scanning space 134 and the chassis 111. The body 11 further includes an alignment recognition device 70. The alignment recognition device 70 is fixedly connected to the chassis 111 and is received in the space between the signal scanning space 134 and the chassis 111. The environment sensing device 20 is partially positioned in the space between the signal scanning space 134 and the chassis 111 and stacked on the alignment recognition device 70. The environment sensing device 20 partially extends into the signal scanning space 134.

In the embodiment, the alignment recognition device 70 is electronically connected to the control circuit board 30. The alignment recognition device 70 is configured to receive an alignment guidance signal of a charging device, such that the intelligent robot 100 can recognize the alignment guidance signal through the alignment recognition device 70, and then can accurately connect to the charging device under the guidance of the alignment guidance signal. The alignment recognition device 70 is fixed on the front end 113 of the chassis 111, and the environment sensing device 20 is stacked on the side of the alignment recognition device 70 facing away from the chassis 111, so as to reduce the occupation space of the environment sensing device 20 in the chassis 111.

The environment sensing device 20 is stacked on the top of the alignment recognition device 70, that is, the environment sensing device 20 is stacked on the side of the alignment recognition device 70 facing away from the chassis 111. The base 21 of the environment sensing device 20 is fixed on the side of the alignment recognition device 70 facing way from the chassis 111, and the scanning assembly 24 of the environment sensing device 20 is located on the side of the base 21 facing away from the alignment recognition device 70, such that the scanning assembly 24 of the environment sensing device 20 is at a relatively high position, and the scanning area formed by the environmental sensing signals passing through is at a relatively high scanning height, thus leaving enough space for the arrangement of the alignment recognition device 70 and other devices on the chassis 111, and avoiding interference therebetween. In addition, the environment sensing device 20 is stacked on the alignment recognition device 70, thus reducing the occupation area of the two components on the chassis 111.

Figure 16:
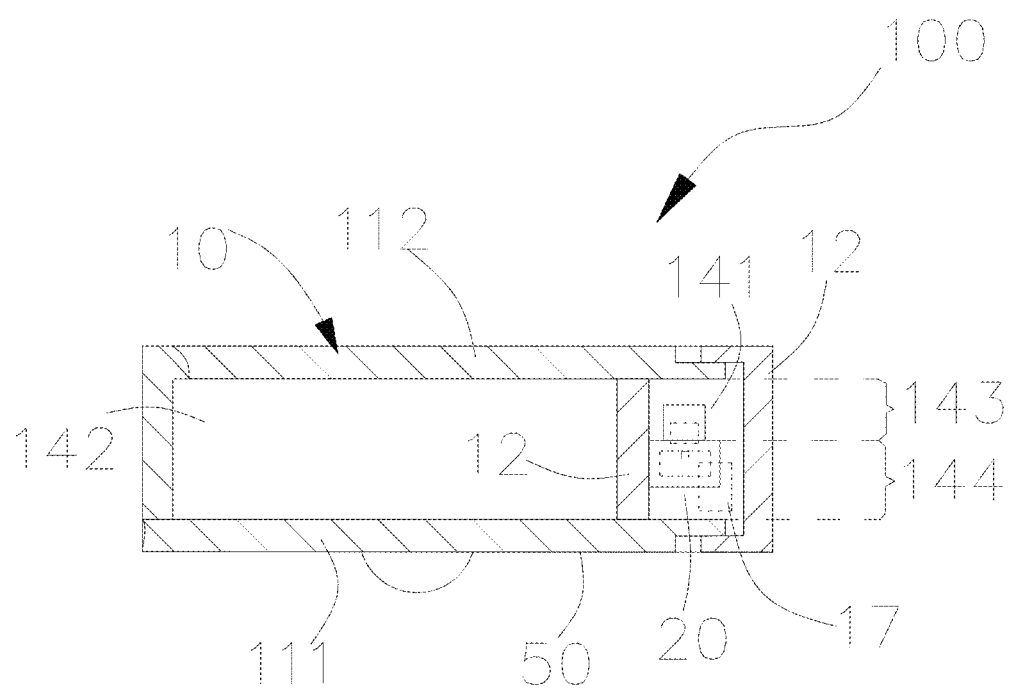
FIG. 16 is a seventh cross-sectional view of the intelligent robot of FIG. 1.

Referring to FIGS. 2, 16 and 17, further, the bottom surface of the main body 10 is defined as a reference surface 50. The first space 141 includes a signal scanning area 143 and an avoidance area 144. The distance between the signal scanning area 143 and the reference surface 50 satisfies a first height threshold, and the distance between the avoidance area 144 and the reference surface 50 satisfies a second height threshold. The first height threshold is greater than the second height threshold, or the first height threshold is less than the second height threshold. The environment sensing device 20 transmits and receives the environmental sensing signals within the preset scanning angle α in the signal scanning area 143. The intelligent robot 100 includes a sensing assembly 17 adjacent to the environment sensing device 20, and the sensing assembly 17 is at least partially positioned in the avoidance area 144.

The reference surface 50 is positioned on the chassis 111. The reference surface 50 is located on the side of the chassis 111 facing away from the top cover 112. The environmental sensing signal of the scanning assembly 24 passes through the signal scanning area 143 which is roughly parallel to the reference plane 50. Because the preset scanning angle α is greater than or equal to 180°, the signal scanning area 143 needs to occupy a part of the space of the inner cavity. To avoid the sensing assembly 17 from blocking the scanning optical path of the laser radar, the sensing assembly 17 is at least partially arranged in the avoidance area 144, such that the sensing assembly 17 is staggered with the signal scanning area 143, thus preventing the blockage of the scanning optical path of the environment sensing device 20.

The sensing assembly 17 can be an obstacle avoidance sensor, a collision detection sensor, a floor detection sensor, or a combination thereof, which is applied as needed.

Referring to FIGS. 16 and 17, further, the surface of the partition structure 13 corresponding to the avoidance area 144 is concave in a direction away from the protective side plate 12 to form an avoidance groove 139. The body 11 includes the front edge 115 adjacent to the protective side plate 12. The chassis 111 includes the front edge 115 adjacent to the protective side plate 12. The front edge 115 is at least partially opposite to the avoidance groove 139, and the sensing assembly 17 includes at least one sensor 201, which is mounted on the front edge 115 and at least partially accommodated in the avoidance groove 139.

In the embodiment, the partition structure 13 includes the avoidance groove 139, and the area of the front edge 115 corresponding to the avoidance groove 139 forms the layout space. The at least one sensor 201 is mounted in the layout space of the front edge 115 and at least partially accommodated in the avoidance groove 139, thus the avoidance groove 139 and the front edge 115 provide space for accommodating other elements. The at least one sensor 201 can be positioned in the space, thus improving the compactness of the intelligent robot. The at least one sensor 201 can be away from the signal scanning area 143, thus preventing blocking the signal of the environment sensing device 20. The at least one sensor 201 can be a cliff sensor. The front edge 115 defines at least one through hole. The at least one sensor 201 is positioned in the at least one through hole respectively, and the part of the at least one cliff sensor extending out of the through hole is positioned in the avoidance groove 139.

Referring to FIG. 3, as an improvement, the protective side plate 12 includes a hollow area 122 extending along the circumference thereof, and the hollow area 122 forms at least a part of the light transmission region 121. The environment sensing device 20 is configured to transmit and receive the environmental sensing light signals through the hollow area 122 of the protective side plate 12, and the partition structure 13 is capable of blocking the dust from entering the second space 142 through the hollow area 122.

The signal transmission rate of the environment sensing device 20 in the hollow area 122 can be further improved, which is conducive to improving the sensing accuracy of the environment sensing device 20.

In one embodiment, the protective side plate 12 includes a light transmitting lens. The light transmitting lens forms the light transmission region 121. The light transmitting lens is in a long strip shape and includes two opposite end edges 123 and two opposite long edges 124. The two long edges 124 are respectively connected to the two end edges 123. The two end edges 123 are located on the opposite sides of the environment sensing device 20, and the hollow area 122 is positioned on the light transmitting lens and is spaced apart from the two end edges 123.

Figure 18:
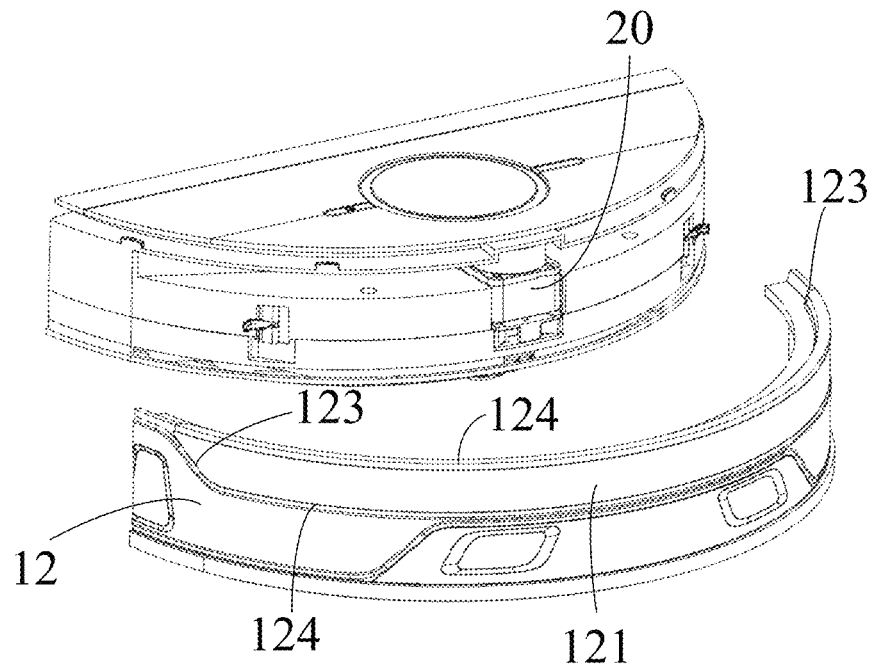
FIG. 18 is an exploded view of part of an intelligent robot according to another embodiment of the present disclosure.

Referring to FIG. 18, in another embodiment, the protective side plate 12 includes a light transmitting lens. The light transmitting lens forms the light transmission region 121. The light transmitting lens is in a long strip shape and includes two opposite end edges 123 and two opposite long edges 124. The two long edges 124 are respectively connected to the two end edges 123. The two end edges 123 are located on the opposite sides of the environment sensing device 20. No hollow area is defined and positioned on the light transmitting lens.

Figure 19:
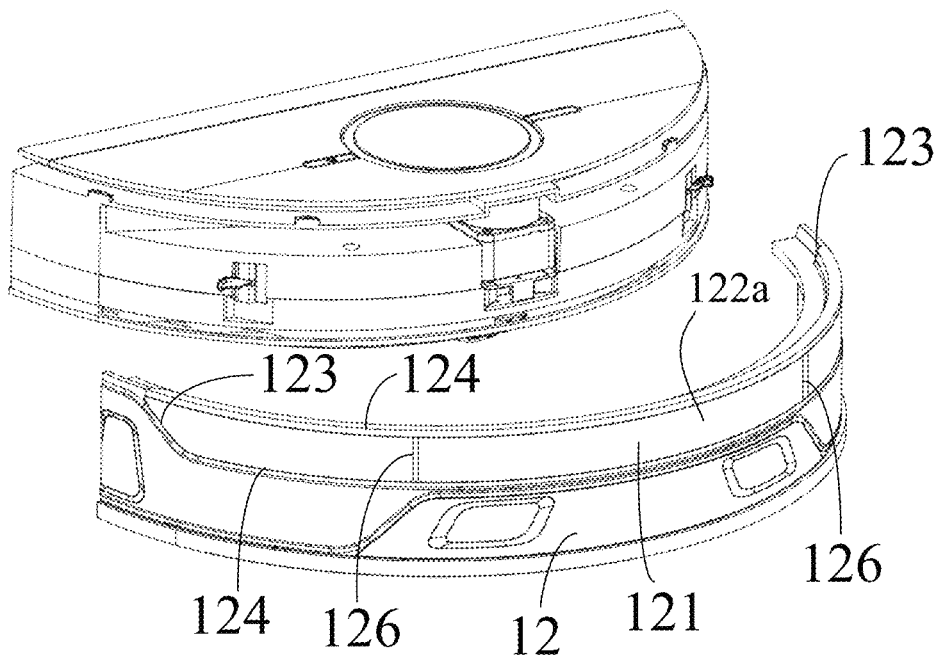
FIG. 19 is an exploded view of part of an intelligent robot according to still another embodiment of the present disclosure.

Referring to FIG. 19, in still another embodiment, the protective side plate 12 defines a hollow area 122*a*, the hollow area 122a completely forms the light transmission region 121, that is, no light transmitting lens is positioned on the protective side plate 12. The hollow area 122a is in a long strip shape and includes two opposite end edges 123 and two opposite long edges 124. The two long edges 124 are respectively connected to the two end edges 123. The protective side plate 12 includes at least one supporting rib 126. The at least one supporting rib 126 is fixed on the two long edges 124 of the hollow area 122a, so as to reinforce the area of the protective side plate 12 corresponding to the hollow area 122a.

In the description of this specification, the description of the reference terms "one embodiment," "some embodiments," "examples," "specific examples," or "some embodiments" and the like means that specific features, structures, materials, or features described in connection with the embodiment or example are included in at least one embodiment or example of the present disclosure. In this specification, a schematic description of the above terms does not necessarily refer to the same embodiment or example. Moreover, the specific features, structures, materials or features described may be combined in an appropriate manner in any one or more embodiments or examples.

The exemplary embodiments described above does not constitute a limitation on the protection scope of the technical solution. Any modification, equivalent replacement and improvement made within the spirit and principle of the above implementation mode shall be included in the protection scope of the technical scheme.

What is claimed is:

1. An intelligent robot, comprising:
   a main body, the main body comprising a body, a protective side plate, and a partition structure, the protective side plate movably connected to the body, the body and the protective side plate cooperatively defining an accommodation cavity, the protective side plate comprising a light transmission region, the partition structure being fixedly connected to the body and received in the accommodation cavity, the partition structure dividing the accommodation cavity into a first space and a second space, the first space located on a side of the partition structure close to the light transmission region, and the second space located on another side of the partition structure away from the light transmission region;
   an environment sensing device, the environment sensing device being at least partially received in the first space, and the environment sensing device capable of transmitting and receiving environmental sensing signals within a preset scanning angle through the light transmission region of the protective side plate; and
   a control circuit board, the control circuit board received in the second space, and the control circuit board electrically connected to the environment sensing device;
   wherein the body comprises a chassis and a top cover fixedly positioned on the chassis; the protective side plate is movably connected to the chassis and the top cover;
   the protective side plate, the chassis, and the top cover cooperatively define the accommodation cavity; one side of the partition structure close to the protective side plate defines a signal scanning space; the signal scanning space forms part of the first space, and the environment sensing device is capable of transmitting and receiving the environmental sensing signals through the signal scanning space;
   wherein a side surface of the partition structure close to the protective side plate is concave to form a mounting groove, the mounting groove communicates with the signal scanning space, and the environment sensing device is at least partially positioned in the mounting groove and partially extends into the signal scanning space;
   wherein the environment sensing device partially extends out of the mounting groove in a direction close to the protective side plate, the main body further comprises a collision protecting component, the collision protecting component comprises a two elastic arms positioned on the partition structure and respectively located on two opposite sides of the environment sensing device, and free ends of the two elastic arms extend beyond the environment sensing device in a direction close to the protective side plate and abut against the protective side plate.

2. The intelligent robot of claim 1, wherein the top cover comprises a side plate, the side plate and the partition structure are adjacent continuously to form a closed loop, and the side plate and the partition structure are cooperatively arranged around an edge of the chassis.

3. The intelligent robot of claim 1, wherein the side surface of the partition structure close to the protective side plate is concave to form two opposite optical channels, the two optical channels both communicate with the mounting groove and are in the shape of long strips, extension directions of the two optical channels form an angle, and the two optical channels form at least part of the signal scanning space.

4. The intelligent robot of claim 3, wherein the signal scanning space comprises an arc-shaped inner wall between the two optical channels, the arc-shaped inner wall is positioned around the environment sensing device, and a center of the arc-shaped inner wall coincides with a scanning center of the environment sensing device.

5. The intelligent robot of claim 1, wherein the body comprises a front edge adjacent to the protective side plate, the partition structure is aligned with the front edge, a protrusion is positioned on one side of the partition structure facing away from the front edge, and the mounting groove is located at a position of the partition structure corresponding to the protrusion.

6. The intelligent robot of claim 1, wherein the signal scanning space is defined on one side of the partition structure close to the top cover, a space is formed between the signal scanning space and the chassis, the body further comprises an alignment recognition device, the alignment recognition device is fixedly connected to the chassis and is received in the space between the signal scanning space and the chassis, the environment sensing device is partially received in the space between the signal scanning space and the chassis and stacked on the alignment recognition device, and the environment sensing device partially extends into the signal scanning space.

7. The intelligent robot of claim 1, wherein the partition structure comprises a first side plate, a second side plate, and a horizontal baffle plate, the first side plate is connected to one side of the chassis close to the top cover, the second side plate is connected to one side of the top cover close to the chassis, the horizontal baffle plate is fixedly connected to the first side plate and the second side plate and is spaced apart from the top cover, and the horizontal baffle plate, the second side plate and the top cover cooperatively define the signal scanning space.

8. The intelligent robot of claim 7, wherein the first side plate is fixed on the edge of the chassis close to the protective side plate, the horizontal baffle plate is spaced apart from the chassis, and a space between the horizontal baffle plate and the chassis forms a part of the second space.

9. The intelligent robot of claim 8, wherein the environment sensing device is partially received in the space between the horizontal baffle plate and the chassis, and the environment sensing device partially extends into the signal scanning space.

10. The intelligent robot of claim 8, wherein the main body comprises at least one collision detection sensor mounted in the space between the horizontal baffle plate and the chassis, and the at least one collision detection sensor is staggered with the signal scanning space.

11. The intelligent robot of claim 10, wherein the first side plate defines at least one opening corresponding to the at least one collision detection sensor one by one in position; each collision detection sensor comprises a movable trigger rod, the trigger rod of each collision detection sensor passes through a corresponding opening to abut again the protective side plate, and the trigger rod of each collision detection sensor is capable of swinging with the movement of the protective side plate.

12. The intelligent robot of claim 1, wherein a bottom surface of the main body is defined as a reference surface, the first space comprises a signal scanning area and an avoidance area, a distance between the signal scanning area and the reference surface satisfies a first height threshold, a distance between the avoidance area and the reference surface satisfies a second height threshold, the first height threshold is greater than the second height threshold, or the first height threshold is less than the second height threshold, the environment sensing device transmits and receives the environmental sensing signals within the preset scanning angle in the signal scanning area, the intelligent robot comprises a sensing assembly adjacent to the environment sensing device, and the sensing assembly is at least partially positioned in the avoidance area.

13. The intelligent robot of claim 12, wherein a surface of the partition structure corresponding to the avoidance area is concave in a direction away from the protective side plate to form an avoidance groove, the body comprises a front edge adjacent to the protective side plate, the front edge is at least partially opposite to the avoidance groove, the sensing assembly comprises at least one sensor, and the at least one sensor is mounted on the front edge and is at least partially accommodated in the avoidance groove.

14. The intelligent robot of claim 1, wherein a bottom surface of the main body is defined as a reference surface, the environment sensing device comprises a base, a light transmitting cover, a driving assembly, and a scanning assembly, the light transmitting cover covers the base, the base is fixed on the body, an orthographic projection of the base on the reference surface coincides with an orthographic projection of the light transmitting cover on the reference surface, the light transmitting cover and the base cooperatively define a receiving chamber, the driving assembly is fixed on the base, the driving assembly and the scanning assembly are both received in the receiving chamber, the driving assembly is capable of driving the scanning assembly to rotate, and the rotating scanning assembly is capable of transmitting and receiving the environmental sensing signals through the light transmitting cover.

15. The intelligent robot of claim 1, wherein the protective side plate defines a hollow area extending along a circumference thereof, the hollow area forms at least part of the light transmission region, the environment sensing device is capable of transmitting and receiving the environmental sensing light signals through the hollow area of the protective side plate, and the partition structure is capable of blocking dust through the hollow area from entering the second space.

16. The intelligent robot of claim 1, wherein the preset scanning angle of the environment sensing device is greater than or equal to 180°.

17. An intelligent robot, comprising:
a main body, the main body comprising a body, a protective side plate, and a partition structure, the protective side plate movably connected to the body, the body and the protective side plate cooperatively defining an accommodation cavity, the protective side plate comprising a light transmission region, the partition structure being fixedly connected to the body and received in the accommodation cavity, the partition structure dividing the accommodation cavity into a first space and a second space, the first space located on a side of the partition structure close to the light transmission region, and the second space located on another side of the partition structure away from the light transmission region;
an environment sensing device, the environment sensing device being at least partially received in the first space, and the environment sensing device capable of transmitting and receiving environmental sensing signals within a preset scanning angle through the light transmission region of the protective side plate; and
a control circuit board, the control circuit board received in the second space, and the control circuit board electrically connected to the environment sensing device;
wherein the body comprises a chassis and a top cover fixedly positioned on the chassis; the protective side plate is movably connected to the chassis and the top cover;
the protective side plate, the chassis, and the top cover cooperatively define the accommodation cavity; one side of the partition structure close to the protective side plate defines a signal scanning space; the signal scanning space forms part of the first space, and the environment sensing device is capable of transmitting and receiving the environmental sensing signals through the signal scanning space;
wherein a side surface of the partition structure close to the protective side plate is concave to form a mounting groove, the mounting groove communicates with the signal scanning space, and the environment sensing device is at least partially positioned in the mounting groove and partially extends into the signal scanning space;
wherein the environment sensing device partially extends out of the mounting groove in a direction close to the protective side plate, the main body further comprises a collision protecting component, the collision protecting component comprises a connection arm and two elastic arms respectively located on two opposite ends of the connection arm, the two opposite ends of the connection arm are fixed on the one side of the partition structure close to the protective side plate, the connection arm stretches across the mounting groove and is tightly attached to the part of the environment sensing device extending out of the mounting groove, and free ends of the two elastic arms extend beyond the connection arm in a direction close to the protective side plate and abut against the protective side plate.

* * * * *